Aug. 24, 1954

V. O. BOWLES 2,687,371

METHOD AND APPARATUS FOR CATALYTIC
HYDROCARBON CONVERSION SYSTEM
Filed Dec. 15, 1949

INVENTOR.
Vernon O. Bowles
BY
Charles A. Huggett
AGENT OR ATTORNEY

Patented Aug. 24, 1954

2,687,371

UNITED STATES PATENT OFFICE 2,687,371

METHOD AND APPARATUS FOR CATALYTIC HYDROCARBON CONVERSION SYSTEM

Vernon O. Bowles, Rye, N. Y., assignor to Socony-Vacuum Oil Company, Incorporated, New York, N. Y., a corporation of New York Application December 15, 1949, Serial No. 133,186

7 Claims. (Cl. 196—52)

This application pertains to a method of and system for the conversion of hydrocarbons to lower boiling hydrocarbons in the presence of a moving bed of particle-form material. The particle-form solid contact material may be catalytic in nature or may merely be an inert heat transfer material. In a typical process of this type, heated liquid or vaporous hydrocarbons are converted to gasoline and other materials by contacting the heated hydrocarbons with a particle-form adsorbent catalyst at a temperature of 800° F. or upwards.

The contact material which is catalytic in nature may partake of the nature of natural or treated clays, bauxite, activated alumina or synthetic associations of silica, alumina or silica and alumina to which other substances such as certain metallic oxides may be added in small amounts for particular purposes. When the contact material is inert in character it may partake of the form of refractory materials such as mullite, zirconium oxide, fused alumina, or Carborundum or it may partake of the form of stones or metallic particles or spheres.

This invention is specifically directed to an improved method and apparatus for converting hydrocarbons wherein the contact material passes cyclically through a conversion zone wherein it is contacted at suitable conversion conditions with liquid or gaseous hydrocarbons to effect conversion thereof and then through a regeneration zone wherein it is contacted with oxidizing gas adapted to burn the carbonaceous deposits formed on the contact material during the conversion.

In one commercially successful system for the conversion of hydrocarbons a regeneration vessel and reaction vessel are located side by side at substantially the same level. A feed hopper is located, in this system, above the reaction vessel. The bottom of the hopper is connected with the top of the reaction vessel by an elongated feed leg. The bottom of the reaction vessel is connected with the top of the regeneration vessel by a suitable bucket type elevator, and the bottom of the regeneration vessel is connected with a downwardly sloping conduit which connects with the top of the hopper by another bucket-type elevator, thus completing an enclosed path through which the contact material continuously moves. It is customary in this system to operate the reaction vessel at approximately 5–10 p. s. i. gauge whereas the feed hopper is operated at 0–1 p. s. i. gauge, although other pressures can be used. It has been found to be undesirable to use locks or other pressure separating means between the feed hopper and the reaction vessel. Therefore, a suitably long feed leg is used that will permit the contact material to enter the reaction vessel against the pressure differential between the reaction vessel and the feed hopper. This has been found to require, for catalyst of about 4–20 mesh (Tyler screen analysis) about 5 feet of feed leg for each pound of pressure differential. Thus a feed leg of about 60–70 feet is normally required. In the side by side system hereinabove described, therefore, a steel structure, supporting the vessels in their proper relative positions, in excess of 200 feet is required. If the feed leg could be materially shortened, the structure could be made smaller, resulting in a substantial saving in structural steel and permitting the use of much shorter elevators.

Recently, it has been found that improvements can be obtained by placing the reaction vessel either directly above or below the regeneration vessel. For example, only one elevator need be used. Or, in place of the elevator a single gas lift can be utilized. With this design, it is even more obvious that if the structure could be shortened by at least a substantial amount of the 60–70 ft. necessitated by the elongated feed leg, greater economy and operating efficiency would result.

Because readily vaporizable charging stocks, suitable for catalytic cracking have, to a certain extent, been exhausted, it is becoming of increasing importance to design cracking apparatus capable of being charged successfully with liquid feed or mixed liquid and vapor feed. Charging liquid feed directly to a hot moving bed of substantially compact contact material introduces several operating problems. For example, the heavy liquid tends to form heavy carbonaceous deposits on the hot metal parts of the reactor with which it comes in contact. These deposits crack and spall, causing large deposits to move with the catalyst. The deposits plug openings in the system because of their size and shape. They interfere with the transfer properties of indirect heat transfer tubes located in the vessels. In addition, they cause irregular gas flow through the moving beds, with many attendant difficulties ensuing therefrom.

The object of this invention is to provide an improved method and apparatus for converting hydrocarbons to lower boiling hydrocarbons in the presence of a particle-form contact material.

A further object of this invention is to provide a method and apparatus for reducing the height of apparatus required for converting hydrocarbons to lower boiling hydrocarbons in the presence of a particle-form contact material.

A further object of this invention is to provide a system for converting heavy liquid hydrocarbons to lower boiling hydrocarbons in the presence of a particle-form contact material.

These and other objects will be made apparent by the following description of the invention. The invention will be described by referring to the attached sketches, by appropriate numbers.

Figure 1 is a vertical section of a hydrocarbon conversion system in which the regeneration zone is located in the upper section and the reaction zone is located in the lower section of a single elongated vertical vessel.

Figure 2 is a continuous hydrocarbon conversion system in which the reaction vessel is located above the regeneration vessel.

Referring first to Figure 1, the downwardly sloping conduit 10 feeds particle-form contact material into the top-most section of the vessel 11, onto the top of the substantially compact column located therein. The tube sheet 12, located horizontally across the vessel, forms a surge chamber thereabove, allowing for slight irregularities in catalyst flow usually encountered in these systems. An inert gas is introduced into the surge chamber through the conduit 13, the flow being controlled by the valve 14. This valve 14 may be controlled, by automatic means, to maintain a blanket of inert gas, such as steam or flue gas, at a predetermined pressure. This gas may be exhausted from the system through the conduit 15. The contact material particles pass downwardly through the tubes 16, located through the tube sheet 12, into the regeneration section 17 therebelow. Air or other combustion supporting gas is introduced into the lower section of the regeneration zone 17 through the header 18 and connecting feeder channels 19. The flow of combustion supporting gas is proportioned by controlling the valves 20, 20 for proper burning rates. The flue gas, formed by the combustion of the carbonaceous deposits on the contact material, is withdrawn from the regeneration chamber through the conduit 21. The flow of flue gas through the outlet conduit 21 may be controlled by the valve 22, whereby any suitable pressure may be maintained in the regeneration zone 17. In the lower section of the regeneration zone are located a series of horizontal plates adapted to provide uniform downward movement of the substantially compact column of contact material. Such plates, of decreasing number of apertures, are well known in the art and are not described further. An inert gas such as steam or flue gas can be introduced through the conduit 23 into the feed leg and withdrawn through the conduit 24 to prevent any combustion supporting gases from being drawn downwardly with the moving contact material. The flow rate may be controlled by the valves 25, 26.

The contact material column discharges from the bottom of the regeneration zone through the elongated feed leg 27, located in the center of the vessel 11. The flow of contact material through the feed leg 27 can be controlled by the valve 28, or it may be allowed to flow unrestrictedly during operation, depending upon operating conditions. The feed leg extends substantially to the bottom of the centrally located enclosed vessel 29. The vessel 29 may be of any suitable cross-section, but is generally of vertically elongated shape with an open top. The plate 30, horizontally located across the vessel 29 near the bottom thereof, is equipped with vertical conduits 31 located therethrough. The conduits 31 have loose-fitting caps 32 located on their upper ends and generally resemble an enlarged bubble cap used in tower fractionating apparatus. Hydrocarbons in vapor form are introduced into the vessel 20 through the conduits 31 at sufficient velocity to maintain the contact material, introduced into the vessel 29 from the feed leg 27, in the form of a "boiling" bed. The vapors are supplied to the conduits 31 through the conduit 33 and manifold 34. The flow of vapors is controlled by the valve 35. The upwardly flowing vapors in the vessel 29 lift the fluidized particle-form material through the open upper end of the vessel. Liquid hydrocarbons can be introduced into the vessel 29 through the conduit 36 and nozzles 37 on the nozzle ring 38. The flow of liquid feed is controlled by the valve 39. The nozzles 37 are suitably located well below the surface of the fluidized bed so that the liquid hydrocarbons will be mixed with the contact material in the boiling region. The liquid hydrocarbons are partially cracked and vaporized upon contact with the contact material in the fluidized region and hence do not tend to form carbon on the hot metal parts. Any deposits which may be formed on the inner walls of the vessel 29 are constantly scrubbed therefrom in small enough particles that they are not objectionable and can readily pass with the contact material.

If liquid feed is not admitted to the reactor, it may be desirable to admit through the the conduit 33 only sufficient hydrocarbon vapors to lift the contact material at a suitable rate. The contact material in the vessel 29 will then assume more the characteristics of a gas lift than a "boiling" or fluidized bed. Additional vapor feed can be admitted through the conduit 9, flow being controlled by the valve 8.

The contact material and hydrocarbons from the vessel 29 pass downwardly in the annulus formed between the outside of the vessel 29 and the interior of the vessel 11. Since the gas velocity is less in the annulus and is downwardly directed, the contact material settles to form a continuous compact column. A floor plate 40 is horizontally located in the lower section of the annulus to provide a support for the column of contact material located thereabove. Conduits 41, radially located about the conical-shaped hollow cap 42, connect with the floor plate 40, allowing the contact material to be withdrawn therethrough. The contact material is discharged from the hollow cap 42 through the conduit 43, the flow being controlled by the valve 44. A suitable seal gas, such as flue gas, can be introduced into the hollow cap 42 through the conduit 45, the flow being controlled by the valve 46. Referring now to the column of contact material, a continuous collecting trough 47 is located near the bottom of the annulus, adapted to withdraw the gases from the contacting region through the outlets 48, 49. The collecting trough, as shown, can be a circular member of inverted substantially U or V shaped cross-section, or several circular members can be used. Other less desirable methods of gas removal may be used, for example, a series of radially located inverted troughs connecting with conduits extending therefrom.

Although some initial cracking is done in the central vessel 29, the major portion of the cracking is performed in the annulus. The bed height of the compact column must, therefore, be maintained at a predetermined level, depending upon operating variables, such as, temperature of hydrocarbons and contact material, type of contact material and hydrocarbons, type of reaction desired, etc., etc. Therefore, a level indicator of some type must be used. A suggested form uses a source 50 of emitted energy, such as radium, buried in the column of contact material. A suitable receiver 51 is located above the bed, adapted to measure the intensity of the energy emitted. This may be a sensitive voltmeter calibrated to read in height of column above a datum level. The voltmeter may be connected to suitable apparatus 52 adapted to automatically operate the valve 44, thereby maintaining a constant bed level in the annulus. This type of apparatus is well known in the art and is not described in detail. Other types of level indicators can be used, such as the rotating vane type which continually rides upon the surface of the bed.

The spent contact material removed through the conduit 43 is lifted by suitable lifting means 53, such as, for example, a continuous bucket type elevator or a conveyor of the Redler type. The raised contact material is introduced into the top of the vessel 11 through the conduit 10.

In this invention it is important to note that the fluidized contact material in the vessel 29 is in indirect heat exchange relationship with the solid contact column located in the annulus surrounding the vessel 29. The hot contact material is introduced into the fluid bed near the bottom thereof from the feed leg at a temperature of 800° F. or higher. The contact material in the bottom of the compact column, therefore, receives heat which tends to keep the temperature from falling below that at which conversion takes place. The temperatures in the compact bed are maintained more uniform, and not affected so extensively by the cooling action of the vapor and liquid hydrocarbon feed. A more uniform product is found to be produced by this design. It is seen, also, that by allowing the feed leg 27 to be located below the surface of the compact bed, a saving in height is obtained, thus resulting in a substantial saving in structural steel required to support the apparatus, and permitting the use of a smaller contact material lifting mechanism.

The valve 54 is normally maintained in the closed position. When draining of the central vessel is required, the valve may be opened and the material removed through outlet hatches in the bottom of the vessel 11, not shown.

Referring now to Figure 2, a continuous hydrocarbon conversion system is shown in which the reaction vessel 60 is shown above the regeneration vessel 80. The structure is shown to illustrate the tower required to support such a system as described.

The hopper 61, located above the reactor 60, is maintained partially filled with the particle form contact material. The material feeds through the feed leg 62 into the central vessel 63. The feed leg is made long enough to cause the contact material to feed into the central vessel against the operating pressure differential. The valve 64 may be wide open or partially closed as desired. Fluidizing hydrocarbon vapors are admitted through the valve 65 and conduit 66 to the manifold 67 and then through the feeders 68 into the lower section of the vessel 63. The boiling bed is maintained high enough to overflow the top of the vessel 63. An inert stripping gas is introduced into the feed leg 62 through the valve 69 and conduit 70 to aid in providing a seal between the hopper 61 and the vessel 63. Liquid feed is introduced into the upper portion of the vessel 63 through the conduit 71 and nozzles 72 at a location well below the surface of the boiling bed. The level indicator 73, of the rotating vane type, is used to automatically control the valve 74, thereby controlling height of the solid contact bed in the annulus surrounding the vessel 63. The inverted V-shaped circular trough 7 is used to remove gases from the bottom of the substantially compact bed, the gases being removed from the vessel through the connecting conduit 75. The spiderlike discharge conduits 76 are shown in the bottom of the vessel 60 adapted to remove the contact material from the bottom of the substantially compact bed to a central hollow cap 77 at a rate which is substantially uniform across the bed. An inert stripping fluid is introduced into the cap 77 through the conduit 78 at a location near the top of the cap. The contact material is removed from the cap 77 through the connecting conduit 79 into the top of the regeneration vessel 80.

An inert stripping fluid may be introduced into the top of the regeneration vessel through the conduit 81, the flow being controlled by the valve 82. An oxidizing gas is introduced into the bottom of the vessel 80 through the conduit 83, the flow being controlled by the valve 84. Flue gas formed by the burning of the carbonaceous material from the contact material in the burning section of the regeneration vessel 80 is removed therefrom through the conduit 85, the flow being controlled by the valve 86. The regeneration vessel interior design may be of any of several constructions well known in the art and therefore, not described in detail herein. A stripping gas may be introduced into the bottom of the vessel 80 through the conduit 87, the flow being controlled by the valve 88.

The contact material is discharged from the bottom of the vessel 80, in reactivated or regenerated form, through the conduit 89, the flow being controlled by the valve 90. The regenerated contact material is introduced into the bottom of the gas lift 91 as is a suitable lifting gas. The gas introduced through the conduit 92, the flow being controlled by the valve 93, lifts the contact material to the top of the lifting mechanism into the disengaging chamber 94. The gas passes off through the elongated central stack 97 and the contact material flows from the disengaging chamber 94 to the top of the hopper 61 through the downwardly sloping conduit 95.

As shown in Figure 2, the invention permits the feed leg to be compressed into the reaction vessel, thereby permitting the structure to be shortened to a marked degree. This may be as much as 40–60 feet on present and future hydrocarbon conversion systems. Although the invention permits both liquid and vapor feed to be charged to the reactor, it is clear that liquid feed need not be charged in order that the apparatus may function.

Although the invention has been described with particular reference to a hydrocarbon conversion system, it is not intended to be limited thereby. Any similar system wherein height is a factor and a particle-form material is contacted with a suitable contacting fluid may derive benefits from the advantages of this invention and such applications of the invention are contemplated. The Figures 1 and 2 are highly diagrammatic in form and are intended only to clarify and illustrate the description of the invention.

I claim:

1. Apparatus for the conversion of hydrocarbons to lower boiling hydrocarbons comprising: a supply hopper, an elongated substantially vertical feed leg located below said hopper, a valve in said feed leg adapted to control the flow of contact material therethrough, an elongated substantially vertical mixing vessel, the bottom of said feed leg being located near the bottom of said mixing vessel, means for feeding vapors into said mixing vessel at sufficient velocity to fluidize contact material introduced into said vessel from said feed leg, said mixing vessel being open at the top to permit the contact material and gases to discharge therefrom, an elongated substantially vertical vessel surrounding said mixing vessel, a horizontal plate in said vertical vessel adapted to define a floor near the bottom of said mixing vessel and provide a support for a substantially compact continuous column of contact material in the annulus surrounding said mixing vessel, a multiplicity of downwardly directed conduits through said floor plate adapted to feed contact material from the bottom of said substantially compact column to a hollow discharge cap, and at least one substantially horizontal inverted endless trough-shaped member located in the annulus surrounding said mixing vessel at a location just above the horizontal plate and means for discharging vapors from said trough shaped member.

2. In combination an elongated vertical vessel, a substantially horizontal plate near the bottom of said vessel, an elongated substantially vertical conduit in contact with said plate and located thereabove in a substantially central location with respect to the cross section of said vertical vessel, a hopper and depending substantially vertical feed leg projected through the top of said vessel and terminating at a location near the bottom of said substantially vertical conduit, orifice means for introducing hydrocarbon vapors into said conduit through the central portion of said substantially horizontal plate, orifice means for introducing hydrocarbons in liquid form into said conduit at a location substantially below the top of the conduit, an inverted substantially-horizontal endless trough-shaped member located in the annulus between said conduit and said vertical vessel at a location just above said substantially horizontal plate, conduit means connecting with said trough-shaped member adapted to discharge gases from said vertical vessel, a multiplicity of downwardly directed conduits located in the outer section of said horizontal plate, and a hollow discharge cap located in the bottom of said vessel connected to the bottom ends of said conduits and means defining an outlet in the bottom of said discharge cap.

3. Apparatus for the conversion of hydrocarbons comprising: an elongated vertical outer vessel, conduit means adapted to feed spent particle-form contact material onto a substantially compact column of said material in the top of said vessel, a substantially horizontal plate located near the top of said vessel adapted to feed contact material through apertures located therein into a regeneration section located therebelow, means for introducing oxidizing gas into said regeneration section and means for removing flue gas from said section formed by the combustion of carbonaceous deposits on the surface of said spent contact material, a substantially horizontal floor in the bottom of said regeneration section, a substantially vertical elongated feed leg depending from said floor adapted to discharge regenerated contact material from the bottom of said regeneration section into a substantially vertical elongated mixing vessel located therebelow as a substantially compact column, the feed leg terminating near the bottom of the mixing vessel, means for introducing hydrocarbon vapors into the bottom of said mixing vessel to fluidize the contact material introduced therein from said feed leg and to lift said contact material out the open top of said vessel, means for introducing hydrocarbons in liquid form into said mixing vessel at a location substantially below the top of said vessel, a substantially horizontal floor plate located near the bottom of the outer vessel adapted to provide a floor for the mixing vessel and a support for a continuous column of the contact material formed by the contact material discharged from the open top of said mixing vessel and settled in the annulus between said mixing vessel and said outer vessel, a multiplicity of downwardly directed discharge conduits depending from said floor plate adapted to conduct contact material from the bottom of said substantially compact column to a discharge cap located in the bottom of said outer vessel, and means for withdrawing gases from said substantially compact column located just above the floor plate in said annulus.

4. The method of converting hydrocarbons to lower boiling hydrocarbons which comprises: maintaining a substantially compact column of contact material through most of the length of a confined reaction zone, feeding particle-form contact material from the bottom of an elongated vertical substantially compact column into a confined mixing zone, closed on the bottom, within and surrounded laterally by the column in said reaction zone and extending through most of the reaction zone length, the feeding column being projected downwardly within said mixing zone to a level near the bottom thereof, maintaining the contact material in said mixing zone in ebullient motion by introducing hydrocarbon vapors, introducing liquid hydrocarbons into said mixing zone at a location substantially below the top of the mixing zone, withdrawing contact material from the top of the mixing zone to the top of column in the reaction zone, withdrawing reaction vapors from the lower section of the column in the reaction zone and withdrawing contact material from the lower end of the column in the reaction zone.

5. Apparatus for the conversion of hydrocarbons comprising: an elongated vertical enclosed reaction vessel, an elongated vertical mixing vessel open at the top, said vessel occupying most of the vertical length of the reaction vessel, an elongated feed leg projected downwardly into said reaction vessel, terminated within said mixing vessel near its bottom, said feed leg being adapted for continuous introduction of granular contact material against a substantial pressure, a valve located in said feed leg adapted to control the discharge of contact material therefrom, means for introducing hydrocarbon vapors into said mixing vessel to fluidize the contact material introduced therein from said feed leg, means for introducing liquid hydrocarbon feed into said mixing vessel at a location substantially below the top of said mixing vessel, means for withdrawing vapors from the lower section of said reaction vessel, and means for withdrawing contact material from the bottom of the vessel.

6. Apparatus for the conversion of hydrocarbons comprising: an elongated vertical enclosed reaction vessel, an elongated vertical mixing vessel open at the top, said vessel occupying most of the vertical length of the reaction vessel, an elongated feed leg projected downwardly into said reaction vessel, terminated within said mixing vessel near its bottom, means associated with said feed leg for maintaining solids in said leg in compacted condition, means for introducing hydrocarbon vapors into said mixing vessel to fluidize the contact material introduced from said feed leg, means for introducing liquid hydrocarbon feed into said mixing vessel at a location substantially below the top of said mixing vessel, means for withdrawing vapors from the lower section of said reaction vessel, and means for withdrawing contact material from the bottom of the vessel.

7. The method of converting hydrocarbons to lower boiling hydrocarbons which comprises: mtaintaining a substantially compact column of contact material through most of the length of a confined reaction zone, feeding particle-form contact material from the bottom of an elongated vertical substantially compact feed column into a confined vertical mixing zone, closed on the bottom, within and surrounded laterally by the column in said reaction zone and extending through most of the reaction zone length, the feeding column being projected downwardly within said mixing zone to a level near the bottom thereof, the mixing zone and the column of contact material being in indirect heat exchange relationship throughout most of the reaction zone length, maintaining the contact material in said mixing zone in ebullient motion by introducing hydrocarbon vapors, introducing liquid hydrocarbons into said mixing zone at a location substantially below the top of the mixing zone, withdrawing contact material from the top of the mixing zone to the top of the column in the reaction zone.

References Cited in the file of this patent

UNITED STATES PATENTS

| Number | Name | Date |
|---|---|---|
| 2,304,128 | Thomas | Dec. 8, 1942 |
| 2,399,050 | Martin | Apr. 23, 1946 |
| 2,414,852 | Burnside et al. | Jan. 28, 1947 |
| 2,418,679 | Utterback | Apr. 8, 1947 |
| 2,420,558 | Munday | May 13, 1947 |
| 2,438,439 | Hemminger | Mar. 23, 1948 |
| 2,487,961 | Angell | Nov. 15, 1949 |
| 2,556,514 | Bergstrom | June 12, 1951 |
| 2,561,408 | Peavy | July 24, 1951 |